April 21, 1970  E. STOKKE  3,507,192

ACTUATOR FOR CONVERTING RECTILINEAR MOTION TO ROTARY MOTION

Filed May 5, 1967

Erling Stokke,
INVENTOR.

BY Wenderoth, Lind
and Ponack, Attorneys

United States Patent Office 3,507,192
Patented Apr. 21, 1970

3,507,192
ACTUATOR FOR CONVERTING RECTILINEAR MOTION TO ROTARY MOTION
Erling Stokke, Drammen, Norway, assignor to A/S Rjukanmaskiner, Rjukan, Norway
Filed May 5, 1967, Ser. No. 636,318
Claims priority, application Norway, May 13, 1966, 163,019
Int. Cl. F01b 9/00; F16j 15/18; F16h 21/44
U.S. Cl. 92—138                                                 4 Claims

ABSTRACT OF THE DISCLOSURE

An actuating device for converting a rectilinear movement to a rotary movement with a fluid pressure cylinder supporting a piston, the rectilinear force of which is transferred to a moment arm on a shaft. The fluid pressure cylinder comprises two axially spaced parts supported by and integral with an interposed housing. A force transferring element is positioned on an intermediate part of the piston and in operative engagement with the moment arm on the shaft.

---

Figure 1:
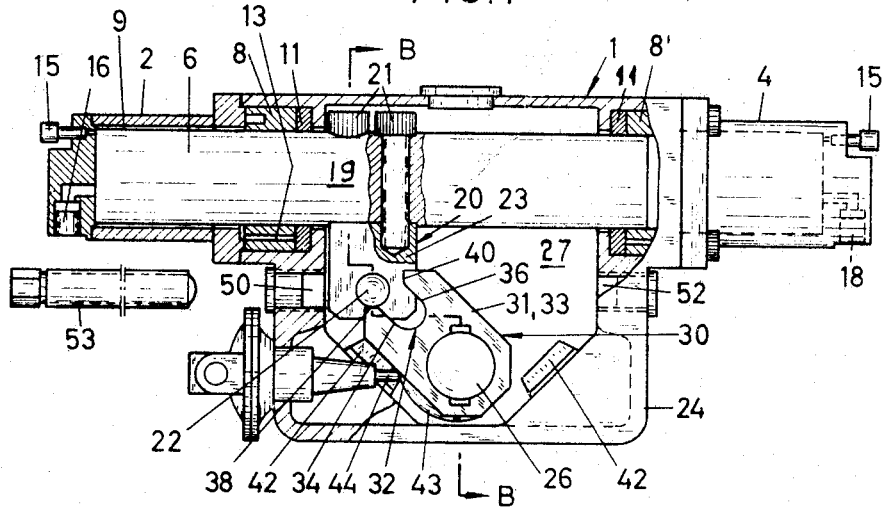

The present invention relates to an actuating device for converting a rectilinear movement to a rotary moment, particularly a so-called actuator of the type used to manoeuvre butterfly valves, the desired rotary movement of the valve stem obtained by means of a pneumatic or hydraulic working cylinder which can be remotely controlled.

More particularly the invention relates to that type actuator, wherein the working cylinder is fixedly mounted on the valve frame or adjacent parts, and such that the rectilinear force from the cylinder is transferred to a moment arm on the stem by means of a pin and yoke mechanism.

In the prior art is known many designs for actuators of this general kind. A shortcoming in known designs is that it is difficult to avoid a certain amount of dead motion and inaccuracy during the movements of the interconnected operating parts in the actuator and the valve, and which is partly due to the fact that such mechanisms have hitherto not possessed sufficiently bending strength. This entails that known actuators of this kind have not been well adapted for actuating relatively large and heavy butterfly valves, wherein relatively large operating forces are required and furthermore, in connection with valves where it is required an absolutely fluid tight closure of the butterfly valve disc.

The main object of the present invention is the provision of an actuator mechanism which does not possess the above mentioned shortcoming, and possesses a mechanically strong build-up, so that slipping and/or dead motions in connection with the conversion of the force and the movements are avoided with absolute certainty.

A further object of the invention is to provide an actuator mechanism which in spite of the before mentioned qualities can be given a compact design with relatively small outer dimensions.

Further objects of the invention are to provide an actuator which also fulfil other prerequisites, among which shall be mentioned that the valve disc shall remain standing immovable in open and closed position even though the supply of pressure medium fails, and such that the valve disc automatically is mechanically locked in open as well as in closed position and further such that the valve disc normally only can be rotated by the actuating mechanism. Nevertheless, it is a special object of the invention to provide a mechanism which also can be devised with a manually operated emergency control means which, however, only can be utilized if the supply of pressure medium has failed or has been purposely disconnected.

The actuating device in accordance with the invention comprises a housing, plunger piston slidably disposed within the housing between two axially spaced cylinders fixed to the housing and constituting parts thereof, said piston supported by one bearing in each of the cylinders, said bearing placed at the inner end of the cylinders, means for supplying fluid under pressure to said cylinders, a laterally directed member fixed to the plunger piston on an intermediate free portion of same and positioned in the inner space of the housing, a shaft rotatably disposed in said housing transversly of said piston and at a distance from same, a lever arm fixed to said shaft adjacent said block, means on said shaft outside the housing adapted to engage apparatus to be rotated, and an operative connection between said block and said lever arm for converting the longitudinal movement of said piston into rotary movement of said lever and thereby said shaft.

By means of the actuator in accordance with the invention is obtained two important mechanical advantages, firstly that there is utilized a double plunger piston which is supported by two fixed bearing means which have short mutual spacing, and which results in that only small moments and lateral forces are created in the piston and adjacent parts. Secondly, by means of the laterally positioned member for transferring the force from the piston, is obtained a great angular stroke on the shaft by means of a short piston stroke.

Figure 2:
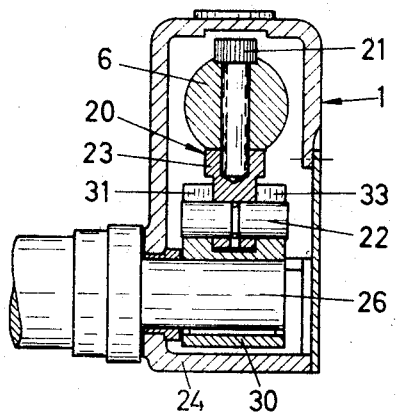

The actuator in accordance with the invention implies also other novel features and advantages which shall be fully described in connection with the accompanying description of a preferred form of the invention, reference being made to the accompanying drawings, wherein:

FIGURE 1 is a longitudinal sectional view of the actuator, the left part shown in a centrical section in order to expose clearly the most important functional parts of the mechanism, and FIGURE 2 is a view showing a section along the line B—B in FIGURE 1.

In the figures the reference number 1 designates the main housing of the mechanism including a double acting and two-part pneumatic or hydraulic working cylinder, comprising two axially spaced parts 2 and 4, and in which is disposed a working piston in the form of a plunger piston 6, supported by two sliding bearings 8, 8'. The sliding bearings are positioned close to the inner end of each of the cylinders 2 and 4 respectively, and between the bearings and the inner spacing 27 of the housing are positioned packing glands 11. Between the plunger piston and the cylinder housing is provided an annular clearance space 9, and through the bearings are likewise arranged flow passages 13 (one is shown), such that the pressure medium which is supplied to the cylinders through fittings 16 and 18, respectively, can pass the bearings and reach the packing glands. Each cylinder is suitably provided with an air vent 15.

To the intermediate and in the housing space free portion 19 of the working piston 6 is fastened a power transfer element 20 in the shape of one by means of screws 21 attached to block 23 through which is journalled a cross going bolt 22. The before mentioned described parts comprise the power imparting elements of the mechanism.

The housing comprises a laterally extending compartment 24, wherein is rotatably journalled, normal to the cylinders, the one end 26 of a shaft which in the shown embodiment constitutes a valve stem on a butterfly valve, which otherwise is not shown in the drawing, since it does not form any part of the present invention. On the stem end 26 is rigidly attached a yoke or fork shaped moment lever arm 30 having legs 31 and 33, the outer portions of which both are devised with radial, open, identical cam surfaces 32, which encompass the free standing end portions of the bolt 22 and further defined, are provided with two opposing, substantially parallel courses 34 and 36 which at the extremities are formed with outwardly inclined or bevelled substantially plane courses which are designated with the numbers 38 and 40, respectively. In the housing is further provided two abutments 42 for the moment lever arm 30, and which are limiting the turning movement of this and thereby is defining the angular stroke of the valve stem. The rectilinear or substantially rectilinear courses 38 and 48 which are forming the outer parts of the cam faces 32, are such angularily disposed that they position themselves parallel with the longitudinal axes through the working cylinders when the moment lever arm is positioned in abutment against respective abutments 42. The mutual angle between the courses 38 and 40 will thus correspond to the total angular displacement of the valve stem, and which in the embodiment shown in the drawing is 90°. The bolt 22 and the other parts are such dimensioned that the bolt 22 during the movement of the piston towards the outer positions can slide along respective courses 38 and 40 with a tight sliding fit.

On the end of the stem 26 is provided a cam disc means 43, which is placed in engagement with an elastic or flexible feeling member 44, which is connected to and forms part of a valve position indicator enabling the actuator to be utilized in a remote controlled valve operating system. The indicator and the elements and parts in connection therewith form otherwise no part of the present invention, and should not require detailed description.

The actuating device in accordance with the invention operates as follows: By introduction of pressure medium, for instance in the right part 4 of the working cylinder, the piston is moved to the left position as shown in the drawing. Thereby the arm 30 is likewise turned in left direction by the bolt 22, which is resting against the surface 34 in the track 32. When the arm is turned to the outermost left position as illustrated in FIGURE 1, and has come to rest against the abutment 42, the bolt 22 is during the final movement of the piston sliding along the rectilinear part 38 and will thus arrive to stop position approximately as shown. It will be understood that the silding of the bolt along the surface 38 will not institute any further turning of the moment arm 30, which hereby, however, will be locked against any turning movement between the abutment 42 and the bolt 22. Force, for instance applied against the valve disc, such that the moment arm 30 is pressed against the bolt 22, will not lead to any turning movement, since the force in its entirety will be directed transversely of the axis of the piston, such that no component of the force will be directed in the path of the movement.

When pressure medium is supplied to the left cylinder 2 (the right cylinder is put in discharging position), the piston 6 will be forced to the right. The bolt 22 will then initially slide and liberate the moment arm 30 from the locking position on the face 38, whereafter the bolt is hitting the face 36 and thereby is guiding the valve stem over to the other outermost position, wherein the moment arm 30 is being locked in a similar fashion.

The most important new feature in the actuator in accordance with the invention lies not in the operation of the mechanism insofar the functional principle in the conversion of the rectilinear movement to a rotary movement is concerned, but in the mechanical build-up of the actuator, namely in that the pressure fluid cylinder or the cylinders have a piston which is devised as a double acting plunger piston, which is supported by two spaced bearings, which are arranged at the inner end of the respective cylinders, and in that between the bearings and the inside space of the main housing are arranged packing glands which prevent pressure fluid from coming into the space in the housing. Hereby is obtained not only a double or twin support of the plunger piston, but also that the distance between the supporting points of the plunger piston can be kept very small. Furthermore, by translating the force from the cylinders by a plunger piston to the pin and yoke mechanism by means of one to the piston attached, laterally extending member, is obtained the mechanical advantage, that by means of a very short piston stroke is effected a large angular stroke on the stem, since the distance between the rectilinear force and the stem axis thereby can be arranged very little. Of importance is also that the bearing supporting the piston has a fixed position relative to the stem and the lever arm with the yoke on same.

An actuator in accordance therewith can be built very compact with small outer dimensions and is nevertheless especially adapted for converting relatively large forces, i.e. the actuator is suitable for manoeuvering the stem of relatively large and heavy butterfly valves.

If the pressure medium for some reason should fail, the mechanism ought to be such devised, that the butterfly valve remains standing in open or locked position, but also such that the valve can be actuated manually by the actuator. This feature is included in that the housing 24 is provided with screw-threaded openings 50, 52 one on each side of the housing portion 24 in which can be placed a jacking screw 53 or the like, which when screwed into the housing—will come to rest against the block 23 attached to the piston. It will be understood that such a manual operation of the valve is conditioned by that pressure medium is not present in the cylinders. In other words, manual operation of the valve can only take place if the pressure medium either has failed or purposely has been coupled out.

What is claimed is:

1. Actuating device for converting a rectilinear movement to a rotary movement, comprising a housing, two axially spaced aligned cylinders in said housing, a plunger piston slidably disposed within said housing between said cylinders, a bearing in each of said cylinders supporting said piston located at the inner end of each of said cylinders, means for supplying fluid under pressure to said cylinders, a shaft rotatably mounted in said housing transversely of said piston, a bifurcated lever arm fixed to said shaft, means on said shaft outside said housing to engage apparatus to be rotated, said plunger piston at its intermediate free portion between said cylinders having a lateral extending member directed towards said shaft and a pin on said lateral member extending parallel to said shaft operatively engaging said bifurcated lever arm, said pin comprising two spaced end parts extending from opposite side walls of said lateral member and said bifurcated lever arm comprising two similar spaced sections straddling said lateral member with each of said sections engaging one of said end parts.

2. Actuating device for converting a rectilinear movement to a rotary movement, comprising a housing, two axially spaced aligned cylinders in said housing, a plunger piston slidably disposed within said housing between said cylinders, a bearing in each of said cylinders supporting said piston located at the inner end of each of said cylinders, means for supplying fluid under pressure to said cylinders, a shaft rotatably mounted in said housing transversely of said piston, a bifurcated lever arm fixed to said shaft, means on said shaft outside said housing to engage apparatus to be rotated, said plunger piston at its intermediate free portion between said cylinders having a lateral extending member directed towards said shaft and a pin on said lateral member extending parallel to said shaft operatively engaging said bifurcated lever arm, said bifurcated lever arm has oppositely positioned sliding faces and the outermost portions of said faces are bevelled outwards and diverging from each other, the angle between said diverging surfaces being equal to the stroke angle of said bifurcated lever on said shaft and said pin rests against one of said outermost bevelled faces in each of the end positions of said bifurcated lever arm.

3. Actuating device as set forth in claim 2, wherein said housing is provided with two abutments defining the angular stroke of said bifurcated lever arm.

4. Actuating device for converting a rectilinear movement to a rotary movement, comprising a housing, two axially spaced aligned cylinders in said housing, a plunger piston slidably disposed within said housing between said cylinders, a bearing in each of said cylinders supporting said piston located at the inner end of each of said cylinders, means for supplying fluid under pressure to said cylinders, a shaft rotatably mounted in said housing transversely of said piston, a bifurcated lever arm fixed to said shaft, means on said shaft outside said housing to engage apparatus to be rotated, said plunger piston at its intermediate free portion between said cylinders having a lateral extending member directed towards said shaft and a pin on said lateral member extending parallel to said shaft operatively engaging said bifurcated lever arm, said housing having a threaded opening for a manual operating means, said operating means comprising a jack-screw threaded through said opening, the outer external end of said jack-screw adapted to be connected to a wrench tool, and the inner end of said jack-screw being applicable onto said lateral member on said piston.

References Cited

UNITED STATES PATENTS

| | | | |
|---|---|---|---|
| 2,851,999 | 9/1958 | Kratz | 92—66 |
| 3,050,247 | 8/1962 | Ljunggren | 92—66 |
| 3,104,592 | 9/1963 | Sheesley | 74—104 |
| 3,253,518 | 5/1966 | Duemler | 74—104 |
| 3,298,286 | 1/1967 | Tyler | 74—104 |
| 2,381,429 | 8/1945 | Bell et al. | 92—138 |

FOREIGN PATENTS 535,262  1/1922  France.

PAUL E. MASLOUSKY, Primary Examiner

U.S. Cl. X.R.
74—104; 92—166